United States Patent
Chen et al.

(10) Patent No.: US 10,902,298 B2
(45) Date of Patent: Jan. 26, 2021

(54) PUSHING ITEMS TO USERS BASED ON A REINFORCEMENT LEARNING MODEL

(71) Applicant: Alibaba Group Holding Limited, George Town (KY)

(72) Inventors: Cen Chen, Hangzhou (CN); Xu Hu, Hangzhou (CN); Chilin Fu, Hangzhou (CN); Xiaolu Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/813,654

(22) Filed: Mar. 9, 2020

(65) Prior Publication Data
US 2020/0342268 A1  Oct. 29, 2020

Related U.S. Application Data

(63) Continuation of application No. PCT/CN2020/071699, filed on Jan. 13, 2020.

(30) Foreign Application Priority Data

Apr. 29, 2019  (CN) .......................... 2019 1 0355868

(51) Int. Cl.
*G06F 7/00*  (2006.01)
*G06F 16/95*  (2019.01)
(Continued)

(52) U.S. Cl.
CPC ....... *G06K 9/6263* (2013.01); *G06F 9/30036* (2013.01); *G06F 17/16* (2013.01); *G06K 9/6221* (2013.01); *G06N 5/046* (2013.01)

(58) Field of Classification Search
CPC  G06K 9/6263; G06K 9/6221; G06F 9/30036; G06F 17/16; G06N 5/046
(Continued)

(56) References Cited

U.S. PATENT DOCUMENTS 9,785,883 B2 * 10/2017 LuVogt .................. G06N 3/006
9,836,545 B2 * 12/2017 LuVogt .............. G06F 16/9535
(Continued)

FOREIGN PATENT DOCUMENTS

CN  104869464  8/2015
CN  108230057  6/2018
(Continued)

OTHER PUBLICATIONS

Crosby et al., "BlockChain Technology: Beyond Bitcoin," Sutardja Center for Entrepreneurship & Technology Technica Report, Oct. 16, 2015, 35 pages.
(Continued)

*Primary Examiner* — Brandon S Cole
(74) *Attorney, Agent, or Firm* — Fish & Richardson P.C.

(57) ABSTRACT

This disclosure is related to determining an item push list for a user based on a reinforcement learning model. In one aspect, a method includes obtaining M first item lists that have been predetermined for a first user. Each first item list includes i−1 items. For each first item list, an ith state feature vector is obtained. The ith state feature vector includes a static feature and a dynamic feature. The ith state feature vector is provided as input to the reinforcement machine learning model. The reinforcement model outputs a weight vector including weights of sorting features. A sorting feature vector of each item in a candidate item set corresponding to the first item list is obtained. The sorting feature vector includes feature values of sorting features. M updated item lists are determined for the first item lists based on a score for each item in M candidate item sets.

12 Claims, 6 Drawing Sheets

(51) Int. Cl.
*G06F 40/20* (2020.01)
*G06N 3/00* (2006.01)
*G06F 3/048* (2013.01)
*G06K 9/62* (2006.01)
*G06N 5/04* (2006.01)
*G06F 17/16* (2006.01)
*G06F 9/30* (2018.01)

(58) Field of Classification Search
USPC .................................................. 706/1–62
See application file for complete search history.

(56) References Cited

U.S. PATENT DOCUMENTS

| | | | |
|---|---|---|---|
| 10,402,495 B1* | 9/2019 | Rush | G10L 25/30 |
| 2013/0055097 A1* | 2/2013 | Soroca | G06F 16/9577 |
| | | | 715/738 |
| 2013/0290110 A1* | 10/2013 | LuVogt | G06F 16/9535 |
| | | | 705/14.66 |
| 2014/0297476 A1 | 10/2014 | Wang et al. | |

FOREIGN PATENT DOCUMENTS

| | | |
|---|---|---|
| CN | 108230058 | 6/2018 |
| CN | 108304440 | 7/2018 |
| CN | 108805594 | 11/2018 |
| CN | 110263245 | 9/2019 |
| WO | WO 2018175098 | 9/2018 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/071699, dated Apr. 13, 2020, 15 pages (with partial machine translation).

Zhi-Cheng et al., "A Survey on Search Result Diversification", Chinese Journal of Computers, Dec. 2019, 23 pages (with English Abstract).

* cited by examiner

PUSHING ITEMS TO USERS BASED ON A REINFORCEMENT LEARNING MODEL

CROSS-REFERENCE TO RELATED APPLICATIONS

This application is a continuation of PCT Application No. PCT/CN2020/071699, filed on Jan. 13, 2020, which claims priority to Chinese Patent Application No. 201910355868.6, filed on Apr. 29, 2019, and each application is hereby incorporated by reference in its entirety.

TECHNICAL FIELD

Implementations of the present specification relate to the field of machine learning, and more specifically, to determining an item push list for a user based on a reinforcement learning model.

BACKGROUND

Conventional customer services are labor and resource-intensive and time-consuming. Therefore, it is important to construct a smart assistant that can automatically answer users' questions. Recently, people increasingly focus on how to better construct such smart assistants through machine learning. As a core function of a customer service robot, user intention prediction is intended to automatically predict questions that users may want to ask and present candidate questions to the users for selection, to reduce the cognitive burden of the users. More specifically, a user intention prediction task can be considered as a task in which top N items are recommended, and each predetermined question is an intention class. Currently, in existing methods, the task is considered as a classification question, and an item list, namely, a question list, that may be of most interest to a user is predicted based on a current user status. These methods are intended to maximize immediate rewards such as clicking while ignoring the impact of a previous recommended item on a following recommended item in a recommendation list.

Therefore, more effective solutions for pushing an item list to a user are needed.

SUMMARY

Implementations of the present specification are intended to provide more effective solutions for determining an item push list for a user based on a reinforcement learning model, to alleviate the disadvantages in the existing technology.

To achieve the objective above, an aspect of the present specification provides a method for determining an item push list for a user based on a reinforcement learning model, where M item lists are predetermined for a first user, each item list currently includes i−1 items, both M and i are integers greater than or equal to 1, i is less than or equal to a predetermined integer N, and the method includes the following: for each item list, obtaining the ith state feature vector, where the ith state feature vector includes a static feature and a dynamic feature, the static feature includes an attribute feature of the first user, and the dynamic feature includes attribute features of the i−1 items in the item list; providing the ith state feature vector as input to the reinforcement learning model, so that the reinforcement learning model outputs a weight vector corresponding to the ith state feature vector, where the weight vector includes weights of a predetermined quantity of sorting features; obtaining a sorting feature vector of each item in a candidate item set corresponding to the item list, where the sorting feature vector includes feature values of the predetermined quantity of sorting features; calculating a score for each item in the candidate item set based on a dot product of the sorting feature vector of each item in the candidate item set and the weight vector; and determining M updated item lists for the M item lists based on a score for each item in M candidate item sets respectively corresponding to the M item lists, where each of the M updated item lists includes i items.

In an implementation, the dynamic feature includes at least the following attribute features of each of the i−1 items: current popularity, an item identifier, and an item type.

In an implementation, the M item lists include a first item list, a candidate item set corresponding to the first item list includes a first item, and a sorting feature vector corresponding to the first item includes at least values of the following sorting features: an estimated click-through rate of the first user on the first item, current popularity of the first item, and diversity of the first item relative to i−1 items in the first item list.

In an implementation, that M item lists are predetermined includes: one item list is predetermined, and the determining M updated item lists based on a score for each item in M candidate item sets respectively corresponding to the M item lists includes: using an item with the highest score in a candidate item set corresponding to the item list as the ith item in the item list based on a score for each item in the candidate item set, and using the item list as an updated item list.

In an implementation, M is greater than or equal to 2, and the determining M updated item lists based on a score for each item in M candidate item sets respectively corresponding to the M item lists includes: determining the M updated item lists by using a beam search algorithm based on the score for each item in the M candidate item sets respectively corresponding to the M item lists.

In an implementation, i is equal to N, and the method further includes: determining an item push list for the first user from the M updated item lists by using the beam search algorithm.

In an implementation, the method further includes: pushing items in the item push list to the first user in an arrangement order of the items, to obtain a feedback of the first user; obtaining N return values based on the arrangement order and the feedback, where the N return values respectively correspond to N iterations of the method from i=1 to N; obtaining the (N+1)th state feature vector, where the (N+1)th state feature vector includes a static feature and a dynamic feature, the static feature includes the attribute feature of the first user, and the dynamic feature includes attribute features of the N items in the item push list; and training the reinforcement learning model based on N groups of data respectively corresponding to the N iterations, to optimize the reinforcement learning model, where the N groups of data include the first group of data to the Nth group of data, and the ith group of data includes the ith state feature vector corresponding to the item push list, a weight vector corresponding to the ith state feature vector, the (i+1)th state feature vector corresponding to the item push list, and a return value corresponding to the ith iteration.

In an implementation, the item is a question asked, and the return value corresponding to the ith iteration in the first to (N−1)th iterations is obtained based on the following feedback of the first user: whether the ith question in the item push list is clicked.

In an implementation, a return value corresponding to the Nth iteration is obtained based on submitted satisfaction information and the following feedback of the first user: whether the Nth question in the item push list is clicked.

In an implementation, the reinforcement learning model is a model based on a deep deterministic policy gradient algorithm.

Another aspect of the present specification provides an apparatus for determining an item push list for a user based on a reinforcement learning model, where M item lists are predetermined for a first user, each item list currently includes i−1 items, both M and i are integers greater than or equal to 1, i is less than or equal to a predetermined integer N, and the apparatus includes the following: for each item list, a first acquisition unit, configured to obtain the ith state feature vector, where the ith state feature vector includes a static feature and a dynamic feature, the static feature includes an attribute feature of the first user, and the dynamic feature includes attribute features of the i−1 items in the item list; a providing unit, configured to provide the ith state feature vector as input to the reinforcement learning model, so that the reinforcement learning model outputs a weight vector corresponding to the ith state feature vector, where the weight vector includes weights of a predetermined quantity of sorting features; a second acquisition unit, configured to obtain a sorting feature vector of each item in a candidate item set corresponding to the item list, where the sorting feature vector includes feature values of the predetermined quantity of sorting features; a calculation unit, configured to calculate a score for each item in the candidate item set based on a dot product of the sorting feature vector of each item in the candidate item set and the weight vector; and a first determining unit, configured to determine M updated item lists for the M item lists based on a score for each item in M candidate item sets respectively corresponding to the M item lists, where each of the M updated item lists includes i items.

In an implementation, that M item lists are predetermined includes: one item list is predetermined, and the first determining unit is further configured to use an item with the highest score in a candidate item set corresponding to the item list as the ith item in the item list based on a score for each item in the candidate item set, and use the item list as an updated item list.

In an implementation, M is greater than or equal to 2, and the first determining unit is further configured to determine the M updated item lists by using a beam search algorithm based on the score for each item in the M candidate item sets respectively corresponding to the M item lists.

In an implementation, i is equal to N, and the apparatus further includes a second determining unit, configured to determine an item push list for the first user from the M updated item lists by using the beam search algorithm.

In an implementation, the apparatus further includes: a push unit, configured to push items in the item push list to the first user in an arrangement order of the items, to obtain a feedback of the first user; a third acquisition unit, configured to obtain N return values based on the arrangement order and the feedback, where the N return values respectively correspond to N iterations of the method from i=1 to N; a fourth acquisition unit, configured to obtain the (N+1)th state feature vector, where the (N+1)th state feature vector includes a static feature and a dynamic feature, the static feature includes the attribute feature of the first user, and the dynamic feature includes attribute features of the N items in the item push list; and a training unit, configured to train the reinforcement learning model based on N groups of data respectively corresponding to the N iterations, to optimize the reinforcement learning model, where the N groups of data include the first group of data to the Nth group of data, and the ith group of data includes the ith state feature vector corresponding to the item push list, a weight vector corresponding to the ith state feature vector, the (i+1)th state feature vector corresponding to the item push list, and a return value corresponding to the ith iteration.

Another aspect of the present specification provides a computer readable storage medium, where the computer readable storage medium stores a computer program, and when the computer program is executed in a computer, the computer is enabled to perform any one of the previous methods.

Another aspect of the present specification provides a computing device, including a memory and a processor, where the memory stores executable code, and when the processor executes the executable code, any one of the previous methods is implemented.

The solutions for determining an item push list for a user based on the reinforcement learning model according to the implementations of the present specification are intended to optimize long-term accumulated hybrid rewards, for example, a final return value can be obtained based on a plurality of dimensions such as a user click and user satisfaction. In addition, a policy function can be dynamically updated and adjusted with question popularity and a change of a user behavior pattern, thereby increasing a click-through rate.

BRIEF DESCRIPTION OF DRAWINGS

Implementations of the present specification are described with reference to the accompanying drawings, so that the implementations of the present specification can be made more clearer.

DESCRIPTION OF IMPLEMENTATIONS

The following describes the implementations of the present specification with reference to the accompanying drawings.

Figure 1:
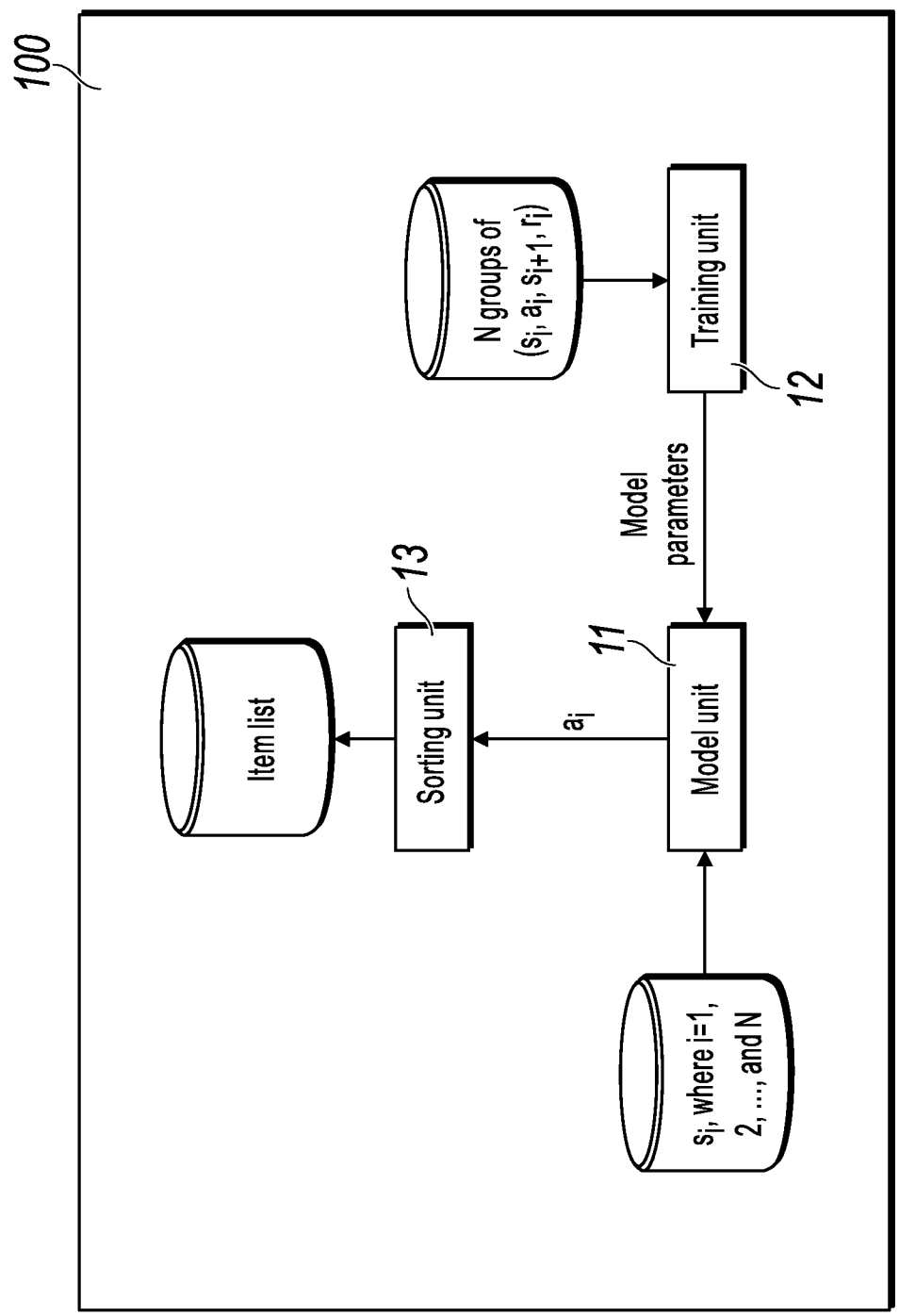
FIG. 1 is a schematic diagram illustrating an item push system 100, according to an implementation of the present specification.

FIG. 1 is a schematic diagram illustrating an item push system 100, according to an implementation of the present specification. The item push system is, for example, a question prediction system, and when a user contacts a customer service, can automatically predict a question list of questions that the user may want to ask, and display the question list on a customer service page, to improve user experience and reduce manual customer service costs. It can be understood that in addition to a list of questions asked, the item push system 100 according to the present implementation of the present specification can be configured to push lists of various items such as products, films and television works, and news. As shown in FIG. 1, the system 100 includes a model unit 11, a training unit 12, and a sorting unit 13. The model unit 11 includes, for example, a neural network, to implement a reinforcement learning algorithm. In the present implementation of the present specification, various reinforcement learning models, such as models based on any one of the following algorithms: DDPG, DPG, and Actor-critic, etc., can be used. Implementations are omitted here. The following provides description by using the DDPG algorithm as an example.

When the system 100 is to push, for example a question list, N consecutive states $(s_1, s_2, \ldots, s_N)$ are sequentially inputted to the model unit 11, and finally, the sorting unit 13 obtains a question push list that includes N questions. For example, when $s_1$ is inputted, the model unit 11 outputs corresponding action $a_1$ based on $s_1$. The sorting unit 13 scores each question based on $a_1$ and a sorting feature of the candidate question, and determines the first question in the question push list based on the score for each question. Here, the first question can be determined by using a greedy search algorithm. It can be understood that the present implementation of the present specification is not limited thereto. For example, the first question also can be determined by using a beam search algorithm. After the first question is determined, second state $s_2$ of an environment is correspondingly determined, in other words, a current state of the environment is related to a feature of a user and a question in the determined question push list. After second state $s_2$ is determined, action $a_2$ and the second question in the question push list can be correspondingly determined. Therefore, when it is preset that the question push list includes N questions, the question push list that includes the N questions can be obtained by performing N decision processes using the model.

After the question push list is obtained, the list is displayed to the user to obtain a feedback of the user, so that return value $r_i$ of each decision of the model can be obtained based on the feedback. Therefore, the training unit 12 can train the reinforcement learning model based on the states, actions, and return value (namely, N groups of $(s_i, a_i, s_{i+1}, r_i)$), and transmit updated parameters to the model unit 11, to update the reinforcement learning model.

The following describes in detail the model decision process and the model training process.

Figure 2:
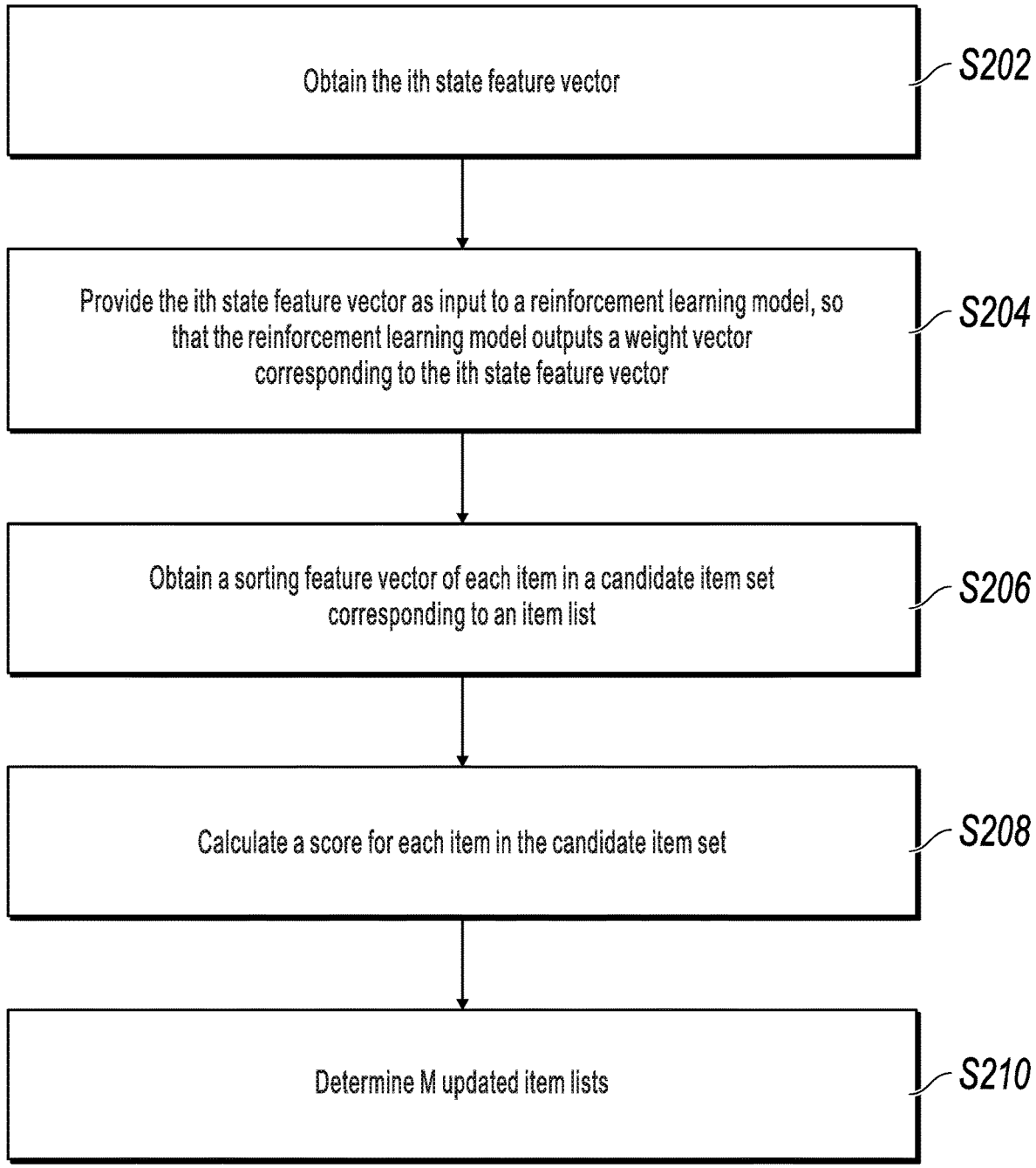
FIG. 2 illustrates a method that is, for example, a decision process of a model unit 11 shown in FIG. 1.

FIG. 2 illustrates a method for determining an item push list for a user based on a reinforcement learning model, according to an implementation of the present specification. M item lists are predetermined for a first user, and each item list currently includes i−1 items, where both M and i are integers greater than or equal to 1, and i is less than or equal to a predetermined integer N. The method includes the following steps.

The following steps are performed for each item list.

Step S202: Obtain the ith state feature vector, where the ith state feature vector includes a static feature and a dynamic feature, the static feature includes an attribute feature of the first user, and the dynamic feature includes attribute features of the i−1 items in the item list.

Step S204: Provide the ith state feature vector as input to the reinforcement learning model, so that the reinforcement learning model outputs a weight vector corresponding to the ith state feature vector, where the weight vector includes weights of a predetermined quantity of sorting features.

Step S206: Obtain a sorting feature vector of each item in a candidate item set corresponding to the item list, where the sorting feature vector includes feature values of the predetermined quantity of sorting features.

Step S208: Calculate a score for each item in the candidate item set based on a dot product of the sorting feature vector of each item in the candidate item set and the weight vector.

Step S210: Determine M updated item lists for the M item lists based on a score for each item in M candidate item sets respectively corresponding to the M item lists, where each of the M updated item lists includes i items.

The method shown in FIG. 2 is, for example, a decision process of the model unit 11 shown in FIG. 1, namely, a process of inputting any one of $s_1, s_2, \ldots, s_N$ to the reinforcement learning model to add one question to the push list of questions. For example, state $s_i$ is going be inputted to the model, where $1 \leq i \leq N$. As described above, when questions are sorted by using a greedy search algorithm, one item list is determined in decision processes of the model based on $s_1, s_2, \ldots, s_{i-1}$, and the item list currently includes i−1 items. When sorting is performed by using a beam search algorithm, for example, a beam width is preset to 2, in other words, M=2, two item lists are determined in decision processes of the model based on $s_1, s_2, \ldots, s_{i-1}$, and each item list currently includes i−1 items.

The following describes in detail each step in the method.

Step S202 to step S208 are steps for each of the M existing item lists, in other words, step S202 to step S208 are implemented for each of the M item lists.

First, in step S202, the ith state feature vector is obtained, where the ith state feature vector includes the static feature and the dynamic feature, the static feature includes the attribute feature of the first user, and the dynamic feature includes the attribute features of the i−1 items in the item list.

The ith state feature vector is state $s_i$. As described above, before the method is implemented, each predetermined item list currently includes the i−1 items. In the present implementation of the present specification, it is set that $s_i$ is not only related to the static feature of the user, but also related to the determined i−1 items, so that the attributes of the existing items in the list can be considered in a process of determining the ith item. The static feature of the user is, for example, an age, an education background, and a geographical location of the user. The dynamic feature is, for example, current popularity, an item identifier (for example, a question number), and an item type of each of the i−1 items. For example, the item is a question that the user asks, and before $s_i$ is inputted to the model to execute the first decision of the model, a predetermined quantity of questions can be preset as a candidate question set for this decision. The popularity of each candidate question can be determined based on a quantity of times a plurality of users ask each candidate question within a predetermined time period. The predetermined quantity of questions can be classified in advance, to determine a type of each question. For example, in a customer service system of Alipay, question types include, for example, a question about HUABEI (Ant Credit Pay), a question about shopping, and a hot question.

Figure 3:
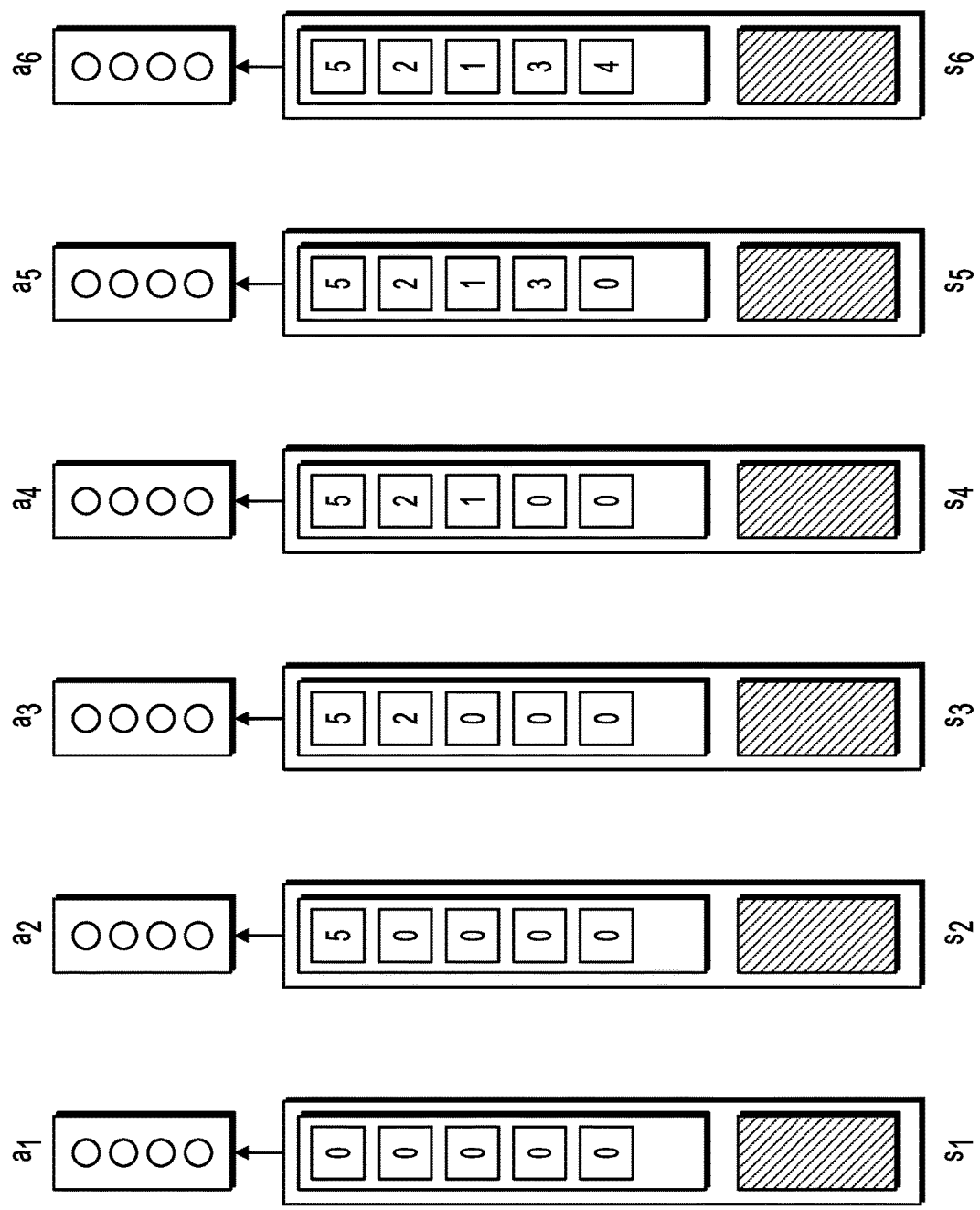
FIG. 3 illustrates a decision process with N (N=6) steps, according to a model of an implementation of the present specification.

FIG. 3 illustrates a decision process with N (N=6) steps, according to the model of the present implementation of the present specification. Input states $s_1$ to $s_6$ in the decision process are included. As shown in FIG. 3, in each state, a data bar in the lower part corresponds to a static feature, and a data bar in the upper part schematically illustrates a part of a dynamic feature. In the dynamic feature part, each block represents a dimension in the dynamic feature part, and a value corresponding to each block represents an attribute, such as a question type, of each question determined in each previous decision. As shown in the figure, before $s_1$ is inputted, no question in the question list is determined. Therefore, the value in each block is 0. Before $s_2$ is inputted, the model has executed the first decision based on input $s_1$, and the first question in the question list is determined. Therefore, a dynamic feature of $s_2$ can be determined based on the first question. As shown in the figure, the first block of the dynamic feature of $s_2$ corresponds to a value 5, which represents, for example, a type identifier of the first question. Similarly, a value 5 in the first block and a value 2 in the second block of a dynamic feature of $s_3$ respectively correspond to types of the first question and the second question in the corresponding question list.

In step S204, the ith state feature vector is provided as input to the reinforcement learning model, so that the reinforcement learning model outputs the weight vector corresponding to the ith state feature vector, where the weight vector includes the weights of the predetermined quantity of sorting features. Still as shown in FIG. 3, in each decision, after state $s_i$ is determined, $s_i$ is inputted to the reinforcement learning model, so that the model can output corresponding action (namely, weight vector) $a_i=\{w_{i0}, w_{i1}, \ldots, w_{im}\}$, where i=1, 2, ... 6, and $w_{ij}$ represents a weight of sorting feature $f_{ij}$. As shown in the figure, a circle in each weight vector $a_i$ represents a dimension of the vector, in other words, corresponds to a value of one weight $w_{ij}$, and three circles represent that j=3. Sorting feature $f_{ij}$ is a feature of each item used to obtain a sorting score, and is described in detail below.

As described above, the reinforcement learning model is, for example, a DDPG model, and the model is obtained through learning based on a neural network. The neural network includes a policy network and a value network. In the present implementation of the present specification, the policy network includes, for example, two fully connected layers. In the policy network, $a_i$ is calculated based on $s_i$ by using the following equations (1) and (2):

$$a_i=\mu(s_i)=\tan h(W_2 H_i + b_2) \quad (1); \text{ and}$$

$$H_i=\tan h(W_1 S_i + b_1) \quad (2), \text{ where}$$

$W_1$, $W_2$, $b_1$, and $\kappa_2$ are parameters in the policy network. A value of each element $w_{ij}$ of $a_i$ is limited to [−1, 1] by using an activation function tan h( ) It can be understood that the previous description is merely an example. The reinforcement learning model is not limited to the DDPG model, and $a_i$ is not limited to being obtained based on $s_i$ by using the policy network. In addition, a structure of the policy network is not limited to activation function tan h( ) and therefore the value of $w_{ij}$ does not need to be limited to [−1, 1]. In step S206, the sorting feature vector of each item in the candidate item set corresponding to the item list is obtained, where the sorting feature vector includes the feature values of the predetermined quantity of sorting features.

As described above, for example, the item is a question asked, and before $s_1$ is inputted to the model to execute the first decision of the model, the predetermined quantity of questions can be preset as the candidate question set for this decision. After $s_1$ is inputted, at least one question list is determined based on a model decision result. One of the at least one question list includes the first question in the question list. Therefore, in a process of inputting, for example, $s_2$ to the model to execute the second decision, a candidate question set corresponding to the question list is a candidate question set obtained by removing the first question from the predetermined quantity of questions. In a subsequent decision process, a candidate question set corresponding to the question list can be similarly determined, to be specific, the candidate question set is a question set obtained by removing a question included in the question list from an initially predetermined question set.

A sorting feature vector of item k in the ith decision of the model can be represented as $f_i^k=\{f_{i0}^k, f_{i1}^k, \ldots, f_{im}^k\}$. Dimensions of the sorting feature vector are the same as the dimensions of action vector $a_i$ output by the model, and respectively correspond to sorting features of the item. Each sorting feature can be determined based on a factor that affects item sorting in a specific scenario. For example, when the item is a question asked in a customer service scenario, the sorting feature includes, for example, an estimated click-through rate of the user in the scenario, current popularity of the question, and question diversity. The estimated click-through rate can be obtained by using an existing click-through rate estimation model (CTR model) based on, for example, historical click behavior and the feature of the user. The estimated click-through rate is used to reflect a preference of the user, the question popularity is used to reflect real-time question popularity, and the question diversity is used to reflect diversity of the recommended question. For example, before the model executes the ith decision, a first question list is currently determined, and a candidate question set corresponding to the first question list includes the first question. Therefore, a question diversity feature value of the first question is determined based on types of existing i−1 questions in the question list. For example, when the types of the i−1 questions do not include a type of the first question, the diversity feature value of the first question can be determined as 1, and when the types of the i−1 questions include the type of the first question, the diversity feature value of the first question can be determined as 0.

In step S208, the score for each item in the candidate item set is calculated based on the dot product of the sorting feature vector of each item in the candidate item set and the weight vector.

After the weight vector in the ith decision and the sorting feature vector of each item in the candidate item set are obtained by performing the previous steps, sorting score $c_i^k$ of question k in the candidate item set in the ith decision can be calculated, for example, by using the following equation (3):

$$c_i^k = \Sigma_{j=0}^m f_{ij}^k \times w_{ij} \quad (3).$$

It can be understood that equation (3) is only an optional calculation method, and calculation of the score is not limited thereto. For example, both the sorting feature vector and the weight vector can be normalized, and then the dot product of the sorting feature vector and the weight vector is calculated to obtain the corresponding score.

in step S210, the M updated item lists are determined for the M item lists based on the score for each item in the M candidate item sets respectively corresponding to the M item lists, where each of the M updated item lists includes the i items.

As described above, the item list can be determined by using a greedy search method or a beam search method based on the score for each item.

Figure 4:
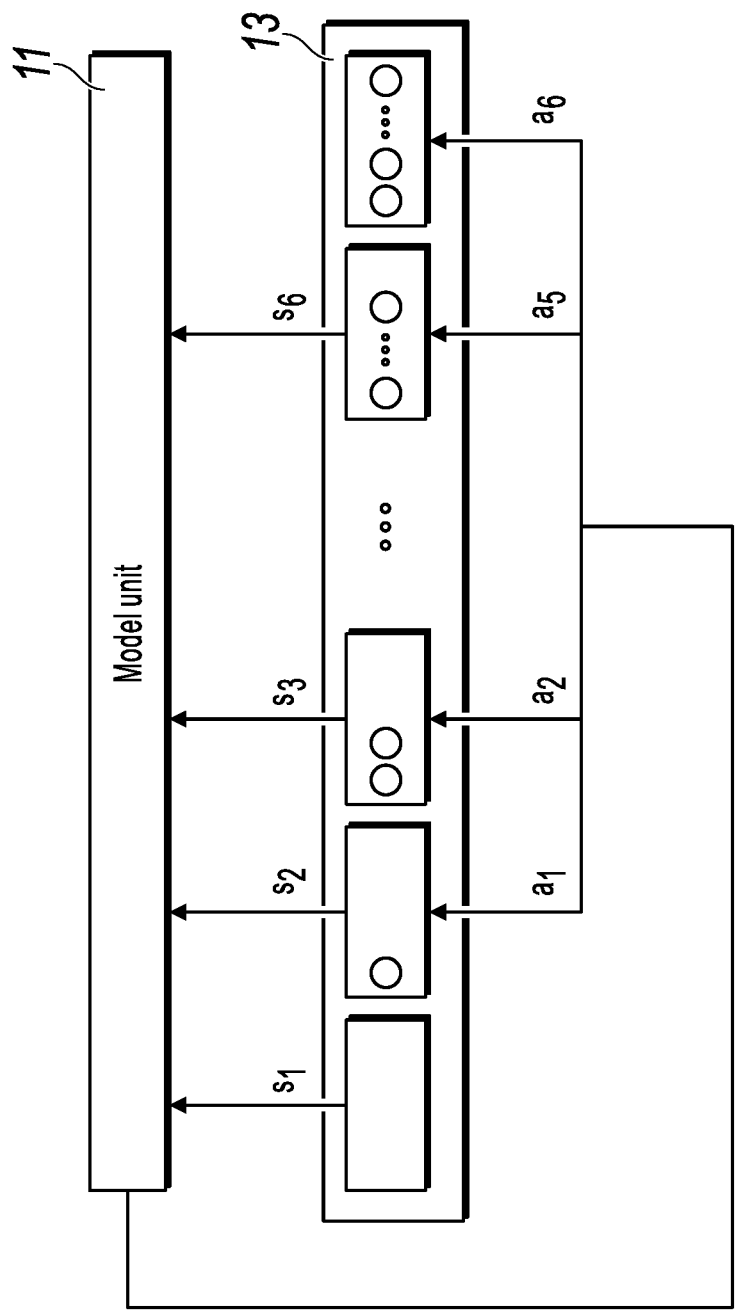
FIG. 4 schematically illustrates a process of determining an item push list in the system shown in FIG. 1 by using a greedy search method.

When the greedy search method is used, in each decision of the model, only an item with the highest score in a candidate item set is selected as the first item in an item push list. FIG. 4 schematically illustrates a process of determining an item push list in the system shown in FIG. 1 by using the greedy search method. As shown in FIG. 4, the figure includes the model unit 11 and the sorting unit 13 in FIG. 1. Initially, the sorting unit determines no item list. In this case, it can be considered that the item list includes 0 items. State $s_1$ in the first decision is determined based on the item list that includes the 0 items, and state $s_1$ is inputted to the model unit. The reinforcement learning model in the model unit obtains action $a_1$ based on state $s_1$. The sorting unit 13 obtains a score for each item in the candidate item set based on $a_1$, and determines an item with the highest score in the candidate item set as the first item in the item list. After the first item is determined, state $s_2$ in the second decision of the model can be determined based on the first item. Similarly, $s_2$ is inputted to the model unit to obtain action $a_2$, then a score for each item in a candidate item set is obtained based on $a_2$, and the second item in the item list is determined based on the score. Then, state $s_3$ in the third decision can be determined based on the first item and the second item in the item list. It can be understood that the candidate item set in the second decision is different from the candidate item set in the first decision, and does not include the first item. Each subsequent decision process can be similarly performed as the previous decision process. For example, after the fifth decision process of the model, action $a_5$ is determined, and then a score for each item in a corresponding candidate item set can be calculated, to determine the fifth item in the item list. Then, state $s_6$ in the sixth decision is determined based on the existing five items in the item list, state $s_6$ is inputted to the model to obtain action $a_6$, and the sixth item in the item list is determined based on $a_6$. Therefore, the item list that includes the six items can be determined by performing six decision processes of the model, and the item list can be pushed to a corresponding user, such as the first user, as an item push list.

Figure 5:
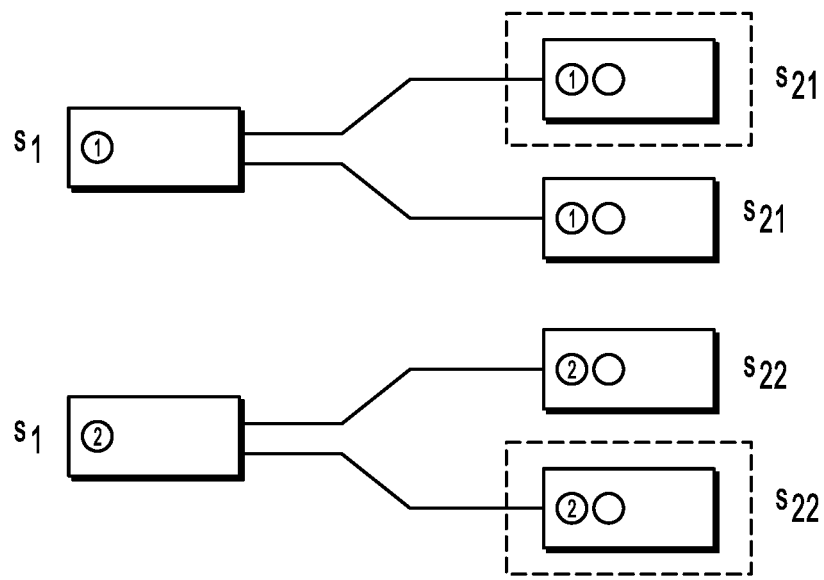
FIG. 5 schematically illustrates a process of determining two item lists by using a beam search method.

When the beam search method is used, for example, a beam width is 2, two item lists are determined in each decision of the model. FIG. 5 schematically illustrates a process of determining two item lists by using the beam search method. As shown in the left part of the figure, in the first decision of the model, after $s_1$ is inputted to the model, a score for each item in the candidate item set can be calculated as that in the previous greedy search method, and two items (for example, item 1 and an item) with top two scores can be obtained as the first items in the two item lists, where "$s_1$" on the left of the two item lists is used to indicate that the two items are obtained based on state $s_1$. As shown in the right part of the figure, after the two item lists in the left part of the figure are obtained, new states $s_{21}$ and $s_{22}$ can be determined based on each item list. Similarly, the second decision of the model can be executed based on states $s_{21}$ and $s_{22}$ to determine two corresponding item lists, in other words, determine four item lists in total in the right part of the figure. As shown in the figure, the two lists in the upper right part of the figure correspond to state $s_{21}$, in other words, both the first items in the two lists are items 1, and the two lists in the lower part correspond to state $s_{22}$, in other words, both the first items in the two lists are item 2. In the four item lists, the sum of scores for the first item and the second item can be calculated separately, and two item lists ranked the first two places in terms of the sum of scores are selected as two item lists determined in the second decision, for example, two item lists in the two dashed-line boxes in the figure. For example, an item push list is to be determined by performing six decision processes of the model, in other words, N=6. In this case, in the sixth decision, as described above, after two item lists are obtained (each item list includes six determined items), among the two item lists, an item list with the highest sum of scores for each item can be pushed to the corresponding user as the item push list.

After the item push list for the user (for example, the first user) is obtained, N items in the list can be pushed to the first user in an arrangement order of the items in the list. For example, the N questions that are sequentially arranged are displayed on a customer service interface, or the N questions are sequentially displayed. After the item push list is pushed to the first user, a feedback of the first user can be obtained, for example, a click of any one of the N questions by the first user and satisfaction information submitted by the user, etc. In an example, a satisfaction button is displayed on the customer service interface, to reflect satisfaction of the user through clicking by the user. When the user clicks the pth item in the item push list, return value $r_i$ corresponding to the ith decision of the model can be determined by using the following equation (4):

$$r_i = \begin{cases} 1^{p==i}\alpha^p & i \neq N \\ 1^{p==i}\alpha^p + r' & i = N \end{cases}. \quad (4)$$

When the user clicks the satisfaction button, r' can be set to 1, otherwise, r' is set to 0. In other words, when the user clicks the ith question and i≠N, $r_i$ is equal to $\alpha^p$, or when i=N (namely, the last decision of the model), $r_i$ is equal to $\alpha^p$+r'. When the user does not click the ith question and i≠N, $r_i$ is equal to 0, or when i=N, $r_i$ is equal to r'.

After the item push list is obtained by performing N decision processes of the model, and return value $r_i$ of each decision of the model from i=1 to i=N is obtained based on the item push list, N groups of ($s_i$, $a_i$, $s_{i+1}$, $r_i$) corresponding to the item push lists can be obtained, and $s_N$+1 in the Nth group of data can be determined based on the N items in the item list. Therefore, the reinforcement learning model can be trained based on the N groups of data. For example, when the reinforcement learning model is a DDPG model, the neural network that implements model calculation includes a value network in addition to the policy network described above, so that parameter updates can be performed for the policy network and the value network based on, for example, a gradient descent method. For example, B represents a set of the N groups of $s_i$, $a_i$, $s_{i+1}$, $r_i$), and Ω represents a parameter of the value network. In this case, Ω can be updated by using the following equation (5):

$$\Omega \leftarrow \Omega - \nabla_\Omega \frac{1}{|B|} \sum_{(s_i,a_i,s_{i+1},r_i)\in B} (Q_\Omega(s_i, a_i) - y(r_i, s_{i+1}))^2. \quad (5)$$

$y(r_i, s_{i+1})$ The following equation (6) is used to obtain $y(r_i, s_{i+1})$ in equation (5):

$$y(r_i, s_{i+1}) = \begin{cases} r_i & i = N \\ r_i + \gamma Q_{\Omega_{tgt}}(s_{i+1}, \mu_{\Theta_{tgt}}(s_{i+1})) & i \neq N \end{cases}, \quad (6)$$

where $\Theta_{tgt}$ represents a target parameter of the value network, $\Theta_{tgt}$ represents a target parameter of the policy network, $\mu_{\Theta_{tgt}}(s_{i+1})$ represents, for example, a function shown in equation (1), and $\Omega_{tgt}$ and $\Theta_{tgt}$ are values obtained based on soft updates. After Ω is updated by using equation (5), $\Omega_{tgt}$ can be updated based on Ω through soft updates. Target parameter $\Theta_{tgt}$ of the policy network can also be updated by using the gradient descent method based on the N groups of data and output Q of the value network. Details are omitted here for simplicity.

Figure 6:
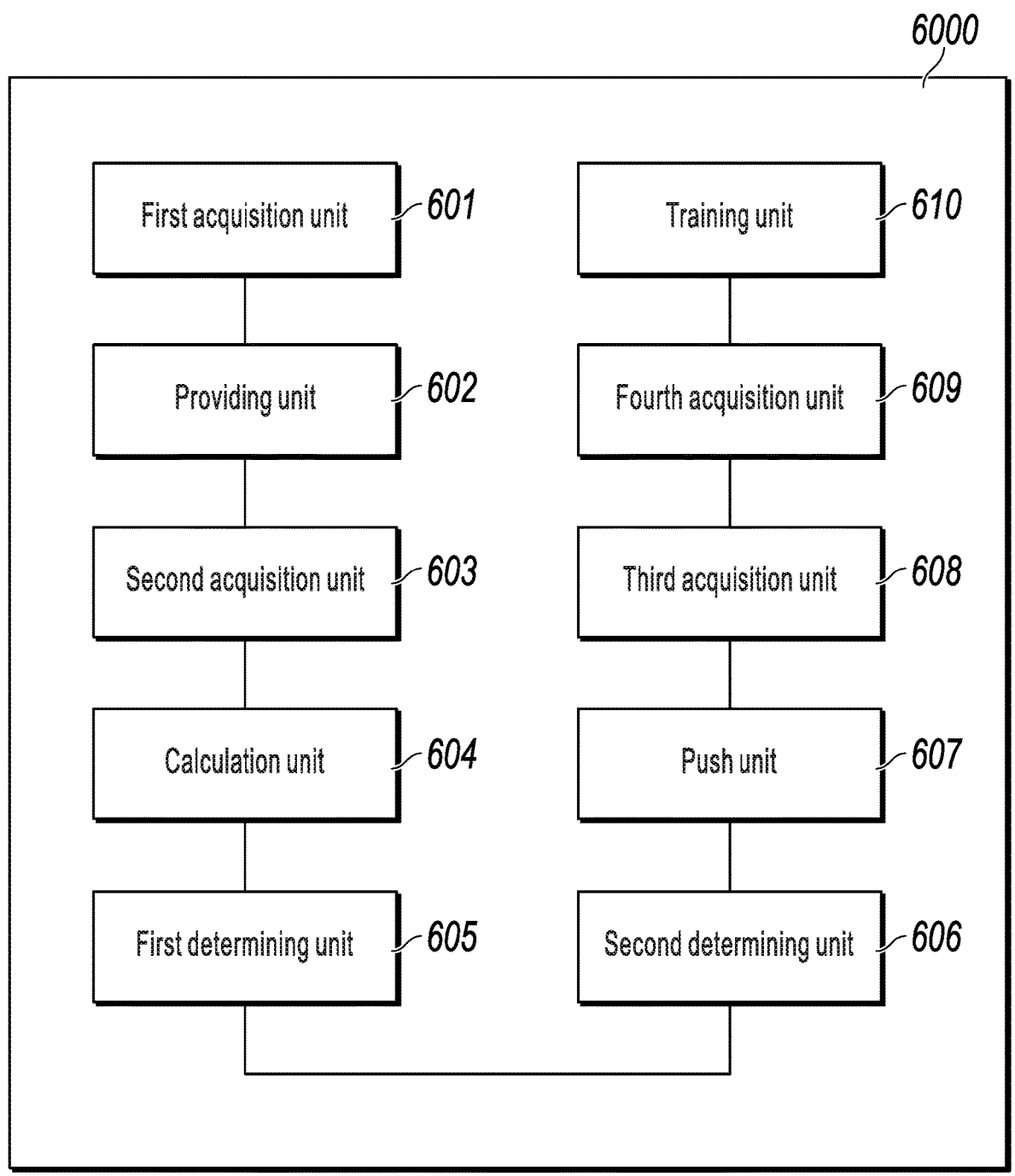
FIG. 6 illustrates an apparatus 6000 for determining an item push list for a user based on a reinforcement learning model, according to an implementation of the present specification.

FIG. 6 illustrates an apparatus 6000 for determining an item push list for a user based on a reinforcement learning model, according to an implementation of the present specification. M item lists are predetermined for a first user, and each item list currently includes i−1 items, where both M and i are integers greater than or equal to 1, and i is less than or equal to a predetermined integer N. The apparatus includes the following: for each item list, a first acquisition unit 601, configured to obtain the ith state feature vector, where the ith state feature vector includes a static feature and a dynamic feature, the static feature includes an attribute feature of the first user, and the dynamic feature includes attribute features of the i−1 items in the item list; a providing unit 602, configured to provide the ith state feature vector as input to the reinforcement learning model, so that the reinforcement learning model outputs a weight vector corresponding to the ith state feature vector, where the weight vector includes weights of a predetermined quantity of sorting features; a second acquisition unit 603, configured to obtain a sorting feature vector of each item in a candidate item set corresponding to the item list, where the sorting feature vector includes feature values of the predetermined quantity of sorting features; a calculation unit 604, configured to calculate a score for each item in the candidate item set based on a dot product of the sorting feature vector of each item in the candidate item set and the weight vector; and a first determining unit 605, configured to determine M updated item lists for the M item lists based on a score for each item in M candidate item sets respectively corresponding to the M item lists, where each of the M updated item lists includes i items.

In an implementation, that M item lists are predetermined includes: one item list is predetermined, and the first determining unit is further configured to use an item with the highest score in a candidate item set corresponding to the item list as the ith item in the item list based on a score for each item in the candidate item set, and use the item list as an updated item list.

In an implementation, M is greater than or equal to 2, and the first determining unit is further configured to determine the M updated item lists by using a beam search algorithm based on the score for each item in the M candidate item sets respectively corresponding to the M item lists.

In an implementation, i is equal to N, and the apparatus further includes a second determining unit 606, configured to determine an item push list for the first user from the M updated item lists by using the beam search algorithm.

In an implementation, the apparatus 6000 further includes: a push unit 607, configured to push items in the item push list to the first user in an arrangement order of the items, to obtain a feedback of the first user; a third acquisition unit 608, configured to obtain N return values based on the arrangement order and the feedback, where the N return values respectively correspond to N iterations of the method from i=1 to N; a fourth acquisition unit 609, configured to obtain the (N+1)th state feature vector, where the (N+1)th state feature vector includes a static feature and a dynamic feature, the static feature includes the attribute feature of the first user, and the dynamic feature includes attribute features of the N items in the item push list; and a training unit 610, configured to train the reinforcement learning model based on N groups of data respectively corresponding to the N iterations, to optimize the reinforcement learning model, where the N groups of data include the first group of data to the Nth group of data, and the ith group of data includes the ith state feature vector corresponding to the item push list, a weight vector corresponding to the ith state feature vector, the (i+1)th state feature vector corresponding to the item push list, and a return value corresponding to the ith iteration.

Another aspect of the present specification provides a computer readable storage medium. The computer readable storage medium stores a computer program, and when the computer program is executed in a computer, the computer is enabled to perform any one of the previous methods.

Another aspect of the present specification provides a computing device, including a memory and a processor. The memory stores executable code, and when the processor executes the executable code, any one of the previous methods is implemented.

Compared with an existing click-through prediction classification model, the solution for determining an item push list for a user based on the reinforcement learning model according to the implementations of the present specification has the following advantages: First, in the solution in the implementations of the present specification, a location of an item that a user clicks and another feedback (for example, whether the user is satisfied, etc.) are considered in addition to a click-through rate of the user, and the additional information is reflected in a return value of the model. Then, scores output by the CTR model and some real-time features are used as inputs to the reinforcement learning model according to the implementations of the present specification, and feature space is small, and therefore iterative updating of the model can be quickly performed, real-time data of different sliding time windows is assisted to perform comprehensive scoring, and a real-time change of an environment can be applied in a timely way while the CTR model is fully used. Finally, in the implementations of the present specification, a model state includes information about a user, information about a scenario, and hierarchical information, so that item push diversity and exploration can be controlled. In addition, a model parameter according to the implementations of the present specification can be intervened and adjusted based on demands in various aspects of data collection, user experience, and effect guarantee.

It should be understood that the description such as "first" and "second" in the present specification is merely intended to distinguish between similar concepts for ease of description, and constitutes no limitation.

The implementations of the present specification are described in a progressive way. For the same or similar parts of the implementations, references can be made to the implementations. Each implementation focuses on a difference from other implementations. In particular, the system implementation is basically similar to the method implementation, and therefore is briefly described. For related parts, references can be made to partial description of the method implementation.

Specific implementations of the present application are described above. Other implementations fall within the scope of the appended claims. In some cases, the actions or steps described in the claims can be performed in an order different from the order in the implementations and the desired results can still be achieved. In addition, the process described in the accompanying drawings does not necessarily require a particular execution order to achieve the desired results. In some implementations, multi-tasking and parallel processing are possible and/or can be advantageous.

A person of ordinary skill in the art can be further aware that with reference to the examples described in the implementations disclosed in the present specification, units and algorithm steps can be implemented by electronic hardware, computer software, and/or a combination thereof. To clearly describe interchangeability between the hardware and the software, compositions and steps of each example are described above based on functions. Whether these functions are performed by hardware or software depends on particular applications and design constraints of the technical solutions. A person of ordinary skill in the art can use different methods to implement the described functions for each particular application, but it should not be considered that this implementation goes beyond the scope of the present application.

Steps of the methods or algorithms described in the implementations disclosed in the present specification can be implemented by hardware, a software module executed by a processor, and or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the described specific implementations, the objective, technical solutions, and beneficial effects of the present disclosure are further described in detail. It should be understood that the previous descriptions are merely specific implementations of the present disclosure, and are not intended to limit the protection scope of the present disclosure. Any modification, equivalent replacement, or improvement made without departing from the spirit and principle of the present disclosure should fall within the protection scope of the present disclosure.

What is claimed is:

1. A computer-implemented method for determining updated item lists based on a reinforcement machine learning model, the method comprising:
    obtaining M first item lists that have been predetermined for a first user, wherein each first item list comprises i−1 items, M is an integer greater than or equal to two, and i is a predetermined integer N that is greater than one;
    for each first item list
        obtaining an ith state feature vector for an ith state of each first item list, wherein the ith state feature vector comprises a static feature and a dynamic feature, wherein the static feature comprises a user attribute feature of the first user and the dynamic feature comprises item attribute features of the i−1 items, respectively in the first item list,
        providing the ith state feature vector as input to the reinforcement machine learning model, wherein the reinforcement machine learning model outputs a weight vector corresponding to the ith state feature vector, and wherein the weight vector comprises weights of a predetermined quantity of sorting features,
        obtaining a sorting feature vector of each item in a candidate item set corresponding to the first item list, wherein the sorting feature vector comprises feature values of the predetermined quantity of sorting features, and
        calculating a score for each item in the candidate item set based on a dot product of the sorting feature vector of each item in the candidate item set and the weight vector;
    determining, using a beam search algorithm, M updated item lists for the first item lists based on the score for each item in M candidate item sets respectively corresponding to the first item lists, wherein each updated item list comprises i items;
    determining an item push list for the first user from the M updated item lists using the beam search algorithm;
    pushing items in the item push list to the first user in an arrangement order to obtain feedback from the first user;
    obtaining N return values based on the arrangement order and the feedback, wherein the N return values respectively correspond to N iterations of pushing items in the item push list to the first user;
    obtaining an (N+1)th state feature vector, wherein the (N+1)th state feature vector comprises the static feature and an additional dynamic feature, wherein the additional dynamic feature comprises additional item attribute features of the items in the item push list; and
    training the reinforcement machine learning model based on N groups of data respectively corresponding to the N iterations, wherein the N groups of data comprise a first group of data to an Nth group of data, and each ith group of data comprises the ith state feature vector corresponding to the item push list, a weight vector corresponding to the ith state feature vector, an (i+1)th state feature vector corresponding to the item push list, and a return value corresponding to an ith iteration of pushing items in the item push list to the first user.

2. The computer-implemented method of claim 1, wherein the item attribute features comprise, for each item in the first item list, (i) a current popularity of the item, (ii) an item identifier for the item, or (iii) an item type for the item.

3. The computer-implemented method of claim 1, wherein, for a particular first item list of the first item lists, the feature values of the predetermined quantity of sorting features comprise (i) an estimated click-through rate of the first user for a first item in a first candidate item set corresponding to the particular first item list, (ii) a current popularity of the first item, or (iii) a diversity of the first item relative to the items in the first item list.

4. The computer-implemented method of claim 1, wherein the first item lists comprise one item list that is predetermined, and
    wherein determining the updated item lists comprises:
        identifying, in the candidate item set corresponding to the one item list, a highest scoring item having a highest score among the items in the candidate set corresponding to the one item list; and
        including the highest scoring item as an ith item in the updated item list corresponding to the one item list.

5. A non-transitory, computer-readable medium storing one or more instructions executable by a computer system to perform operations comprising:
    obtaining M first item lists that have been predetermined for a first user, wherein each first item list comprises i−1 items, M is an integer greater than or equal to two, and i is a predetermined integer N that is greater than one;
    for each first item list
        obtaining an ith state feature vector for an ith state of each first item list, wherein the ith state feature vector comprises a static feature and a dynamic feature, wherein the static feature comprises a user attribute feature of the first user and the dynamic feature comprises item attribute features of the i−1 items, respectively in the first item list, providing the ith state feature vector as input to a reinforcement machine learning model, wherein the reinforcement machine learning model outputs a weight vector corresponding to the ith state feature vector, and wherein the weight vector comprises weights of a predetermined quantity of sorting features, obtaining a sorting feature vector of each item in a candidate item set corresponding to the first item list, wherein the sorting feature vector comprises feature values of the predetermined quantity of sorting features, and calculating a score for each item in the candidate item set based on a dot product of the sorting feature vector of each item in the candidate item set and the weight vector;

determining, using a beam search algorithm, M updated item lists for the first item lists based on the score for each item in M candidate item sets respectively corresponding to the first item lists, wherein each updated item list comprises i items;

determining an item push list for the first user from the M updated item lists using the beam search algorithm;

pushing items in the item push list to the first user in an arrangement order to obtain feedback from the first user;

obtaining N return values based on the arrangement order and the feedback, wherein the N return values respectively correspond to N iterations of pushing items in the item push list to the first user;

obtaining an (N+1)th state feature vector, wherein the (N+1)th state feature vector comprises the static feature and an additional dynamic feature, wherein the additional dynamic feature comprises additional item attribute features of the items in the item push list; and training the reinforcement machine learning model based on N groups of data respectively corresponding to the N iterations, wherein the N groups of data comprise a first group of data to an Nth group of data, and each ith group of data comprises the ith state feature vector corresponding to the item push list, a weight vector corresponding to the ith state feature vector, an (i+1)th state feature vector corresponding to the item push list, and a return value corresponding to an ith iteration of pushing items in the item push list to the first user.

6. The non-transitory, computer-readable medium of claim 5, wherein the item attribute features comprise, for each item in the first item list, (i) a current popularity of the item, (ii) an item identifier for the item, or (iii) an item type for the item.

7. The non-transitory, computer-readable medium of claim 5, wherein, for a particular first item list of the first item lists, the feature values of the predetermined quantity of sorting features comprise (i) an estimated click-through rate of the first user for a first item in a first candidate item set corresponding to the particular first item list, (ii) a current popularity of the first item, or (iii) a diversity of the first item relative to the items in the first item list.

8. The non-transitory, computer-readable medium of claim 5, wherein the first item lists comprise one item list that is predetermined; and wherein determining the updated item lists comprises:
identifying, in the candidate item set corresponding to the one item list, a highest scoring item having a highest score among the items in the candidate set corresponding to the one item list; and including the highest scoring item as an ith item in the updated item list corresponding to the one item list.

9. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

obtaining M first item lists that have been predetermined for a first user, wherein each first item list comprises i−1 items, M is an integer greater than or equal to two, and i is a predetermined integer N that is greater than one;

for each first item list
obtaining an ith state feature vector for an ith state of each first item list, wherein the ith state feature vector comprises a static feature and a dynamic feature, wherein the static feature comprises a user attribute feature of the first user and the dynamic feature comprises item attribute features of the i−1 items, respectively in the first item list, providing the ith state feature vector as input to a reinforcement machine learning model, wherein the reinforcement machine learning model outputs a weight vector corresponding to the ith state feature vector, and wherein the weight vector comprises weights of a predetermined quantity of sorting features, obtaining a sorting feature vector of each item in a candidate item set corresponding to the first item list, wherein the sorting feature vector comprises feature values of the predetermined quantity of sorting features, and calculating a score for each item in the candidate item set based on a dot product of the sorting feature vector of each item in the candidate item set and the weight vector;

determining, using a beam search algorithm, M updated item lists for the first item lists based on the score for each item in M candidate item sets respectively corresponding to the first item lists, wherein each updated item list comprises i items;

determining an item push list for the first user from the M updated item lists using the beam search algorithm;

pushing items in the item push list to the first user in an arrangement order to obtain feedback from the first user;

obtaining N return values based on the arrangement order and the feedback, wherein the N return values respectively correspond to N iterations of pushing items in the item push list to the first user;

obtaining an (N+1)th state feature vector, wherein the (N+1)th state feature vector comprises the static feature and an additional dynamic feature, wherein the additional dynamic feature comprises additional item attribute features of the items in the item push list; and training the reinforcement machine learning model based on N groups of data respectively corresponding to the N iterations, wherein the N groups of data comprise a first group of data to an Nth group of data, and each ith group of data comprises the ith state feature vector corresponding to the item push list, a weight vector corresponding to the ith state feature vector, an (i+1)th state feature vector corresponding to the item push list, and a return value corresponding to an ith iteration of pushing items in the item push list to the first user.

10. The computer-implemented system of claim 9, wherein the item attribute features comprise, for each item in the first item list, (i) a current popularity of the item, (ii) an item identifier for the item, or (iii) an item type for the item.

11. The computer-implemented system of claim 9, wherein, for a particular first item list of the first item lists, the feature values of the predetermined quantity of sorting features comprise (i) an estimated click-through rate of the first user for a first item in a first candidate item set corresponding to the particular first item list, (ii) a current popularity of the first item, or (iii) a diversity of the first item relative to the items in the first item list.

12. The computer-implemented system of claim 9, wherein the first item lists comprise one item list that is predetermined; and
   wherein determining the updated item lists comprises:
      identifying, in the candidate item set corresponding to the one item list, a highest scoring item having a highest score among the items in the candidate set corresponding to the one item list; and
      including the highest scoring item as an ith item in the updated item list corresponding to the one item list.

* * * * *